US008662552B2

(12) United States Patent
Torres-Jara (10) Patent No.: US 8,662,552 B2
(45) Date of Patent: Mar. 4, 2014

(54) DEXTEROUS AND COMPLIANT ROBOTIC FINGER

(75) Inventor: Eduardo R. Torres-Jara, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 163 days.

(21) Appl. No.: 13/027,350

(22) Filed: Feb. 15, 2011

(65) Prior Publication Data

US 2012/0013139 A1 Jan. 19, 2012

Related U.S. Application Data (60) Provisional application No. 61/338,689, filed on Feb. 23, 2010.

(51) Int. Cl.
*B25J 15/00* (2006.01)
(52) U.S. Cl.
USPC .............................. 294/111; 294/907; 901/33
(58) Field of Classification Search
USPC ......... 294/106, 111, 213, 907; 901/33, 34, 46
See application file for complete search history.

(56) References Cited

U.S. PATENT DOCUMENTS

| | | | |
|---|---|---|---|
| 4,149,278 A | 4/1979 | Wiker et al. |
| 4,588,348 A | 5/1986 | Beni et al. |
| 4,865,376 A | 9/1989 | Leaver et al. |
| 4,982,611 A | 1/1991 | Lorenz et al. |
| 4,986,723 A | 1/1991 | Maeda |
| 5,062,673 A | 11/1991 | Mimura |
| 5,133,216 A | 7/1992 | Bridges |
| 5,200,679 A | 4/1993 | Graham |
| 5,207,114 A | 5/1993 | Salisbury et al. |
| 5,246,465 A | 9/1993 | Rincoe et al. |
| 5,261,266 A | 11/1993 | Lorenz et al. |
| 5,501,498 A | 3/1996 | Ulrich |
| 5,565,749 A | 10/1996 | Jinno et al. |
| 5,570,920 A | 11/1996 | Crisman et al. |
| 5,650,704 A | 7/1997 | Pratt et al. |
| 5,761,940 A | 6/1998 | Moore et al. |
| 5,762,390 A | 6/1998 | Gosselin et al. |
| 5,825,980 A | 10/1998 | Danmoto et al. |
| 5,828,813 A | 10/1998 | Ohm |
| 5,859,422 A | 1/1999 | Friedman |
| 5,910,720 A | 6/1999 | Williamson et al. |
| 6,220,104 B1 | 4/2001 | Yoshino et al. |
| 6,244,644 B1 | 6/2001 | Lovchik et al. |

(Continued)

FOREIGN PATENT DOCUMENTS

WO     2008/080231 A1     7/2008

OTHER PUBLICATIONS

Eduardo Torres-Jara and Jessica Banks. A simple and scalable force actuator. International Symposium of Robotics. Paris. Mar. 2004.

(Continued)

*Primary Examiner* — Saul Rodriguez
*Assistant Examiner* — Gabriela Puig
(74) *Attorney, Agent, or Firm* — Sam Pasternack; MIT Technology Licensing Office (57) ABSTRACT

A robotic finger that includes multiple phalanges, each phalange configured to be compliantly actuated. The robotic finger also includes compliant touch sensors that, in combination with the compliant actuation, provides the robotic finger with two levels of compliance. The two levels of compliance enable the robotic finger to gently conform to and manipulate objects.

13 Claims, 8 Drawing Sheets

(56) References Cited

U.S. PATENT DOCUMENTS

| | | |
|---|---|---|
| 6,373,218 B2 | 4/2002 | Takanashi et al. |
| 6,432,112 B2 | 8/2002 | Brock et al. |
| 6,692,485 B1 | 2/2004 | Brock et al. |
| 6,772,673 B2 | 8/2004 | Seto et al. |
| 7,077,446 B2 | 7/2006 | Kameda et al. |
| 7,168,748 B2 | 1/2007 | Townsend et al. |
| 7,361,197 B2 | 4/2008 | Winfrey |
| 2008/0106258 A1 | 5/2008 | Torres-Jara |

OTHER PUBLICATIONS

Eduardo Torres-Jara, Iuliu Vasilescu and Raul Coral. A Soft Touch: Compliant tactile sensors for sensitive manipulation. CSAIL Technical Report MIT-CSAIL-TR-2006-014 Mar. 1, 2006.

Eduardo Torres-Jara and Gabriel Gomez. Fine sensitive manipulation. Australasian Conference on Robotics and Automation, Canberra, Australia, Dec. 3-5, 2008.

The International Search Report and Written Opinion issued in connection with International Patent Application No. PCT/US2011/025001 mailed on Dec. 13, 2011.

DEXTEROUS AND COMPLIANT ROBOTIC FINGER

This invention was made with government support under Grant No.: FA8750-07-1-0033, awarded by the U.S. Air Force. The Government has certain rights in this invention. This application claims priority to U.S. provisional application Ser. No. 61/338,689 filed Feb. 23, 2010, the contents of which are incorporated herein by reference.

BACKGROUND OF THE INVENTION

A major problem in robotics is the lack of a general purpose hand or gripper with capability of fine manipulation. Available robotic hands are generally heavy and rigid and lack any type of touch feedback. Thus, the robotic hands can easily knock over or break the object they are supposed to pick up.

SUMMARY OF THE INVENTION

In a first aspect, the invention is a robotic finger having two levels of compliance. The finger includes a proximal phalange having first and second joint ends and a distal phalange having a joint end and a tip end, wherein the joint end of the distal phalange is coupled to the second joint end of the proximal phalange in a hinged manner. A first compliant actuator is configured to exert a torque on the proximal phalange about the first joint end and a second compliant actuator configured to exert a torque on the proximal phalange about the first joint end, the first and second compliant actuators providing a first level of compliance. At least one compliant touch sensor is mounted on the distal phalange, the at least one compliant touch sensor configured to contact an object before the distal phalange and to compliantly conform to the object and to sense the object. The at least one compliant touch or tactile sensor provides a second level of compliance. In a preferred embodiment, the proximal phalange is coupled to a base at its first joint end in a hinged manner. This embodiment further includes at least one compliant touch sensor mounted on the proximal phalange, the at least one compliant touch sensor configured to contact an object before the distal phalange contacts the object and to compliantly conform to the object and to sense the object.

In yet another aspect, the invention is a robotic finger including a mount and a proximal phalange coupled at a first end to the mount via a first joint. A distal phalange is coupled at a joint end to a second end of the proximal phalange via a second joint, the distal phalange including a tip end opposite the joint end. A first actuator is connected to the proximal phalange and configured to exert a torque on the proximal phalange about the first joint. A second actuator is connected to the distal phalange and configured to exert a torque on the distal phalange about the second joint. A first torque sensor detects the torque from the first actuator on the first joint and a second torque sensor detects the torque from the second actuator on the second joint. A controller is provided and is configured to actuate the first and second actuators to move the robot finger, to detect contact of the at least one of the proximal and distal phalanges with an object by sensing changes in the detected torque at the first and second joints and to cause at least one of the first and second actuators to exert a torque on the respective proximal and distal phalanges to exert a force on the object.

In yet another aspect, the invention is a method of contacting an object using a robotic finger including moving at least one of a proximal and distal phalange of a robotic finger by applying a first compliant torque to at least one of the proximal and distal phalanges. Contact of at least one of the proximal and distal phalanges with an object is detected by sensing a change in the first compliant torque on at least one of the proximal and distal phalanges. A force is exerted on the object with at least one of the proximal and distal phalanges by exerting a second compliant torque to at least one of the proximal and distal phalanges. In a preferred embodiment of this aspect of the invention contact forces are sensed at the distal phalange.

In yet another aspect, the invention is a robotic hand including a base, and a plurality of robotic fingers. Each robotic finger includes a proximal phalange coupled at a first end to the base via a first joint, a distal phalange coupled to a joint end to a second end of the proximal phalange via a second joint, the distal phalange including a tip end opposite the joint end. The finger further comprises a first actuator connected to the proximal phalange and configured to exert a compliant torque on the proximal phalange about the first joint, and a second actuator connected to the distal phalange and configured to exert a compliant torque on the distal phalange about the second joint. A first torque sensor detects the compliant torque from the first actuator on the first joint and a second torque sensor detects the compliant torque from the second actuator on the second joint. The robotic hand further includes a controller configured to actuate the first and second actuators of each of the plurality of robotic fingers and to detect contact of at least one of the plurality of robotic fingers with an object by sensing changes in the detected compliant torque at the first and second joints of the at least one of the plurality of robotic fingers. The controller is further configured to cause at least one of the actuators of the plurality of robotic fingers to exert a compliant torque on the respective ones of the plurality of robotic fingers to exert a force on the object.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF PREFERRED EMBODIMENTS

A description of example embodiments of the invention follows.

Figure 1:
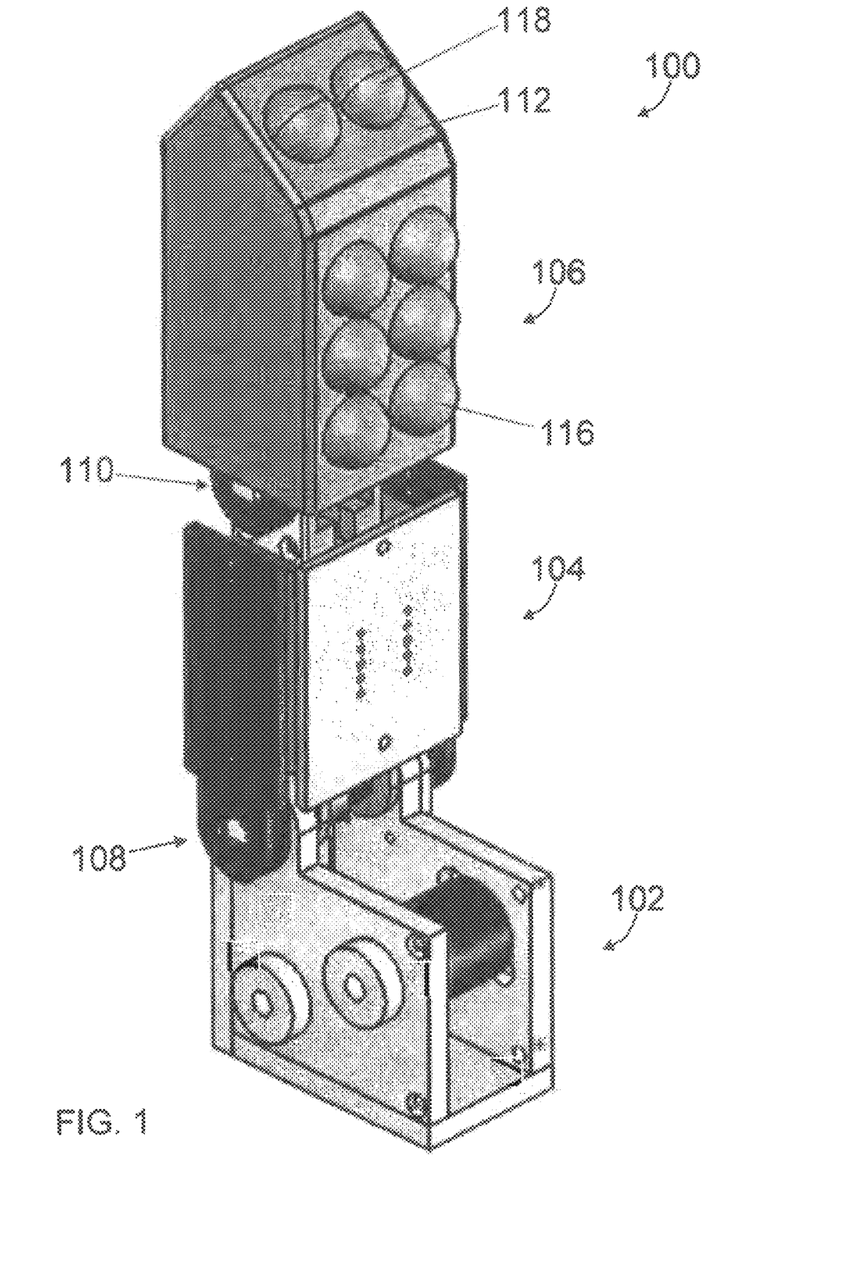
FIG. 1 is an isometric view of a robotic finger according to an embodiment of the present invention.

FIG. 1 illustrates a robotic finger 100 according to an embodiment of the present invention. The robotic finger 100 includes a base 102, a proximal phalange 104 and a distal phalange 106. The proximal phalange 104 is attached to the base 102 by a first joint 108. The distal phalange 106 is attached to the proximal phalange 104 by a second joint 110. The distal phalange 106 has an angled tip with an angled portion 112. The distal phalange also has tactile touch sensors 116 and 118 that are compliant.

Figure 2A:
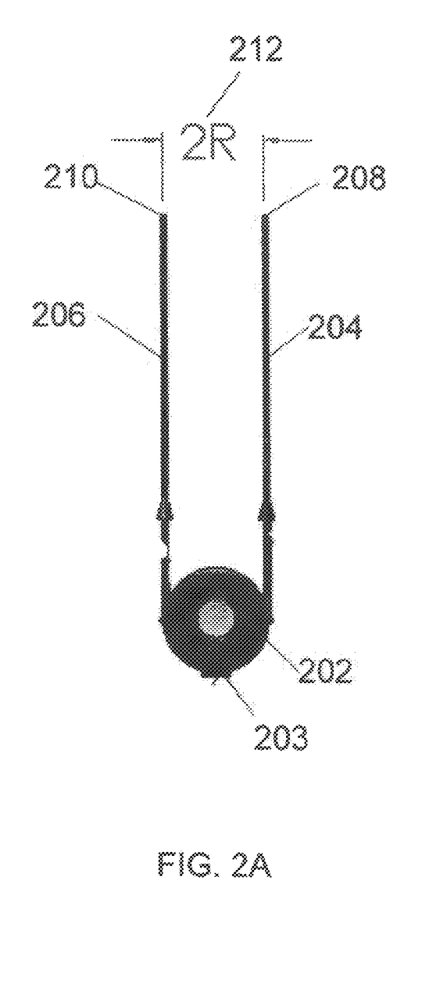
FIGS. 2A and 2B are side views of a series elastic actuator according to an embodiment of the present invention.
Figure 2B:
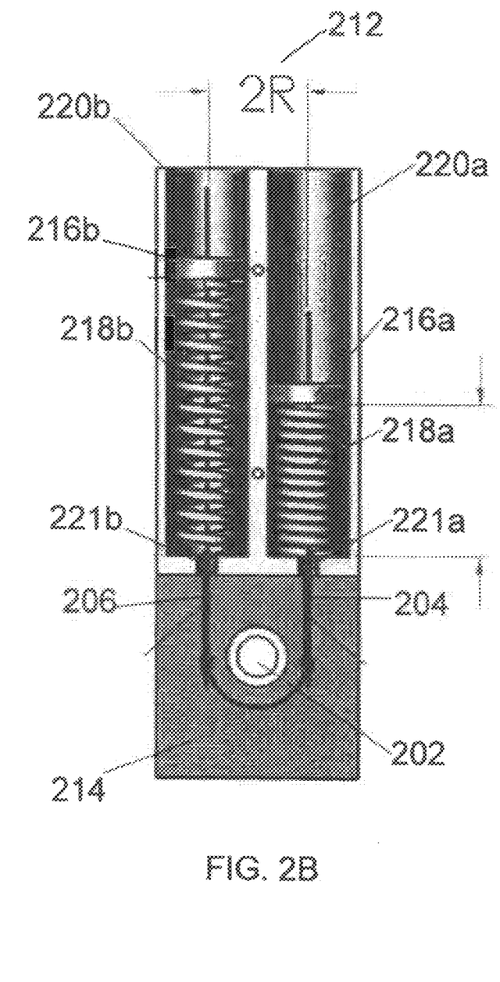

Each of the proximal phalange 104 and the distal phalange 106 includes a series elastic actuator, such as the elastic actuator disclosed in U.S. Pat. No. 5,650,704, which is incorporated herein by reference in its entirety. An example of a series elastic actuator is shown in FIGS. 2A and 2B. FIG. 2A shows a pulley 202 with a wire represented by 204 and 206 attached to it by a locking mechanism 203. The pulley 202 pivots around its central axis to exert a pulling force on either end 208 of wire 204 or at end 210 of wire 206, depending on the direction of rotation of the pulley 202. FIG. 2B shows the pulley 202 and wire 204 and 206 in a series elastic actuator housing 214. The series elastic actuator has a housing 214 and two chambers 220a-b. Each chamber 220a-b includes a spring 218a-b and an endcap 216a-b. The wire portions 204 and 206 feed through holes 221a-b at the bottom of chambers 220a-b. The wire portions 204 and 206 feed through the springs 218a-b and attach to the endcaps 216a-b. Rotation of the pulley 202 causes the wire portion, either 204 or 206, under tension to compress its respective spring. For example, if pulley 202 is rotated clockwise as shown in FIG. 2B, then wire portion 204 is pulled towards the pulley likewise pulling endcap 216a and compressing spring 218a. In an embodiment of a series elastic actuator, both springs 218a and 218b are maintained in a compressed state so that as spring 218a compresses as shown in FIG. 2B, spring 218b expands. As spring 218a is compressed as shown in FIG. 2B, a torque is exerted on housing 214 of the series elastic actuator about the axis of rotation of pulley 202, the torque being equal to the spring force (caused by the compression of the spring) multiplied by the distance R 212 of the center of the spring 218a from the centerline of rotation of the pulley 202. That torque causes the series elastic actuator housing 214 to rotate, in this case in a clockwise direction.

Importantly, the series elastic actuator provides a compliant torque, which means that the torque applied by pulley 202 is not directly coupled to the series elastic actuator housing 214. Instead, the torque load is transmitted through either spring 218a or spring 218b, depending on the direction of rotation of pulley 202. Under no loading, when pulley 202 is rotated then series elastic actuator housing 214 will rotate at the same rate. However, if a load is applied to an exterior portion of series elastic actuator housing 214 then, as pulley 202 turns, one of springs 218a and 218b will compress, absorbing some of the load and enabling the torque about pulley 202 to increase gradually as the spring compression increases. If a spring 218a or 218b fully compressed, i.e., if the spring force transmitted as a torque about the pulley 202 is saturated, then the series elastic actuator can apply additional torque in a non-elastic manner. As shown in FIG. 2B, spring 218a is nearly fully compressed. When spring 218a fully compresses, the force of endcap 216a is transmitted through the spring 218a directly to the bottom of chamber 220a. The force of endcap 218a can exceed the spring force of spring 218a when spring 218a is fully compressed. Therefore, the presence of the springs does not mean that the torque that can be applied is limited, in general.

Figure 3:
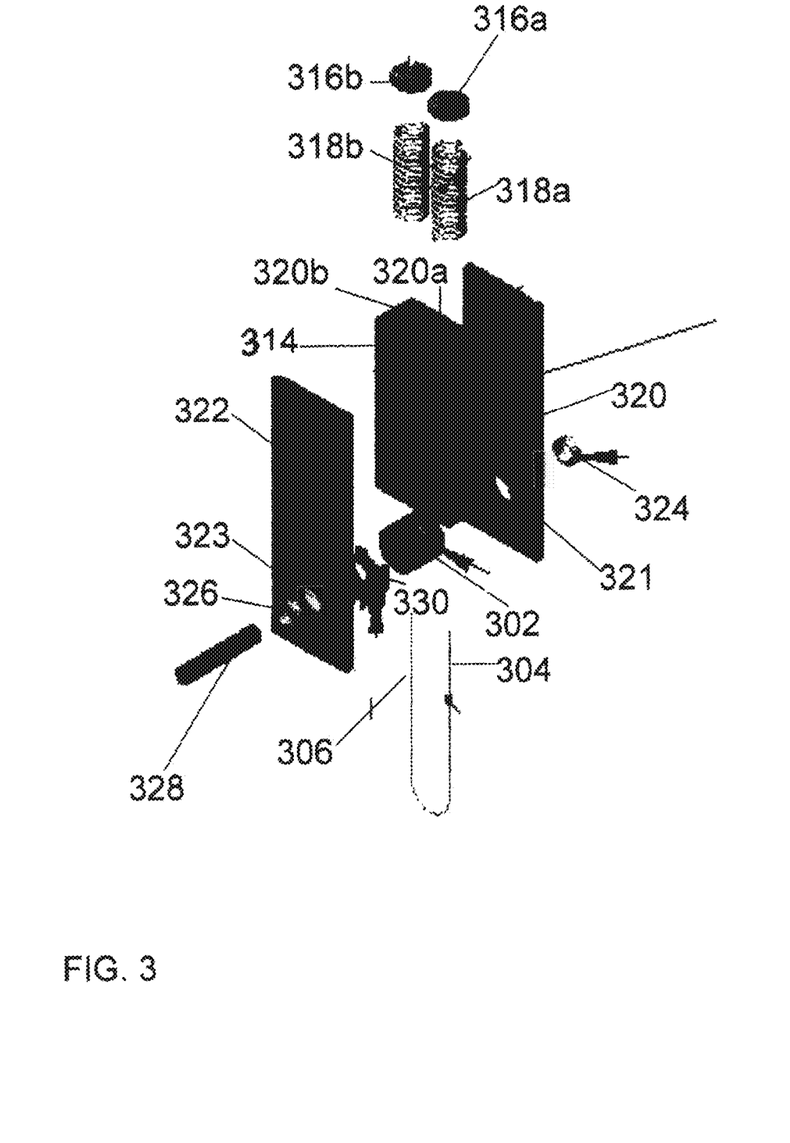
FIG. 3 is an exploded isometric view of a series elastic actuator according to an embodiment of the present invention.

FIG. 3 illustrates a series elastic actuator being used in a phalange for a robotic finger such as that shown in FIG. 1. Series elastic actuator housing 314 is shown in a perspective view with chambers 320a-b visible. Springs 318a-b and endcaps 316a-b are shown in an exploded view above chambers 320a-b. Wire 304, 306 is shown in an exploded view beneath series elastic actuator housing 314. The series elastic actuator housing 314 includes two walls 320, 322, which attach to sides of the series elastic actuator housing 314. A portion of walls 320, 322 include holes 321 and 323 through which a shaft 328 is threaded. The holes also support two bushings 324, 326 which enable the shaft 328 to rotate. The shaft also supports pulley 302 shown beneath the series elastic actuator housing 314. Also shown is a potentiometer 330 which measures rotation of the shaft 328 relative to wall 322 in this case and thereby relative to series elastic actuator housing 314. This rotation of the shaft 328 relative to wall 322 can be combined with the stiffness coefficients of the springs 318a-b to calculate a torque being applied to the series elastic actuator housing 314 about the shaft 328, and thereby being applied to the phalange.

As described in FIG. 2B, the springs 218a-b and endcaps 216a-b enable the pulley 212 to rotate in a compliant manner with respect to series elastic actuator body 214. Potentiometer 330 shown in FIG. 3 enables measurement of the compliant rotation of pulley 302 and shaft 328 relative to series elastic actuator body 314 and walls 320, 322.

Figure 4:
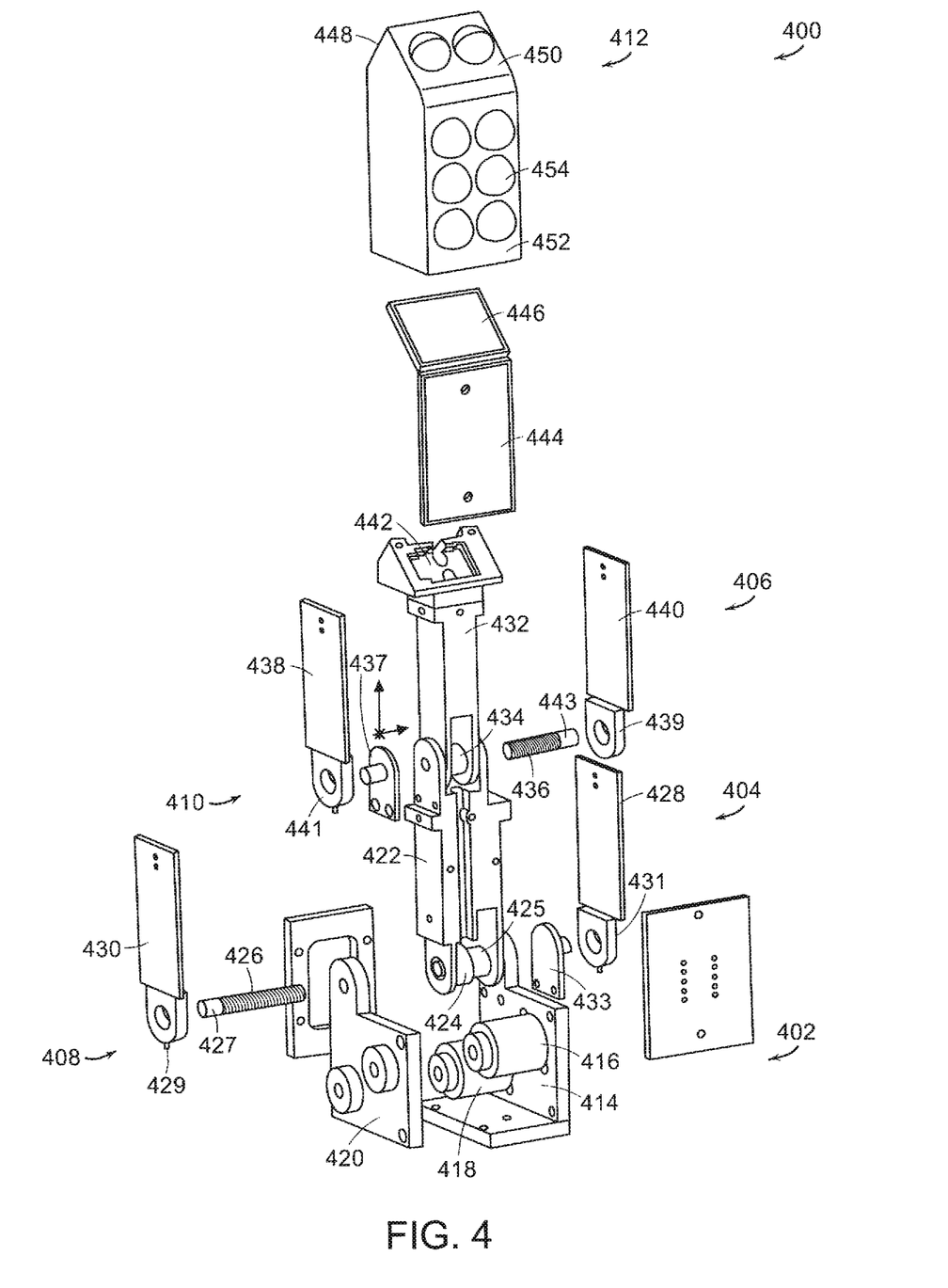
FIG. 4 is an exploded isometric view of a robotic finger according to an embodiment of the present invention.

FIG. 4 shows an exploded view of a robotic finger 400 similar to the assembled finger 100 shown in FIG. 1. FIG. 4 shows the base (or mount) portion 402, the proximal phalange portion 404, the tip portion 406. Also shown in FIG. 4 are joint portions 408 and 410. The base portion includes two walls 414, 420 that support drive pulleys 416 and 418, which are turned by motors (not shown), e.g., electric motors. The proximal phalange portion 404 includes a series elastic actuator housing 422 and end walls 428 and 430. Walls 428 and 430 hold potentiometers 431 and 429, respectively, in place. Walls 428 and 430 may also include printed circuit boards for the potentiometers 431 and 429. Shaft 426 connects the proximal phalange portion 404 to the base portion 402 in a hinged manner. The shaft includes potentiometer portion 427 and wall 430 includes potentiometer portion 429. Potentiometer portion 427 rotates inside of potentiometer portion 429. Wall 428 carries a second potentiometer portion 431 and a second potentiometer portion 427 is attached to the base portion 402 at wall 414. As described with respect to FIG. 3, potentiometer portion 427 on shaft 426 and potentiometer portion 429 on wall 430 measure rotation of pulley 425 relative to series elastic actuator housing 422 and walls 428, 430. Potentiometer portions 433 and 431, mounted to the wall 414 and wall 428, respectively, measure rotation of the proximal phalange portion 404 relative to the base portion 402. The distal phalange portion 406 is coupled to the proximal phalange portion 404 in a similar manner as proximal phalange portion 404 is attached to base portion 402. The distal phalange portion 406 includes a second series elastic actuator housing 432 and walls 438, 440. The distal phalange portion 406 also includes a shaft 436 at second joint 410. The shaft 436 carries potentiometer portion 443 and wall 440 carries potentiometer portion 439. These potentiometer portions 443,439 measure relative rotation of pulley 434 with respect to series elastic actuator housing 432. Wall 438 carries potentiometer portion 441 and the first series elastic actuator housing 422 carries potentiometer portion 437. Potentiometer portions 441 and 437 measure rotation of series elastic actuator housing 432 and walls 438 and 440 with respect to series elastic actuator housing 422.

The distal phalange portion 406 also carries a tip structure 442. The tip structure 442 and series elastic actuator 432 carry sensor platforms 446 and 444, respectively. A sleeve 412, made of compliant material, fits over distal phalange portion 406, covering sensor platforms 446 and 444. The compliant cover 412 includes multiple surfaces, including surface 452 and angled surfaces 450 and 448.

The cover 412 also carries several compliant touch sensors 454 which are described in greater detail in U.S. Publication No. 2008/0106258, which is incorporated herein by reference in its entirety. The compliant touch sensors 454 deform when an external load or force is applied to its surface. For example, if a normal load, i.e., a load perpendicular to the surface of a touch sensor, is applied, then the touch sensor 454 will deform in an even manner. By contrast, if a sheer force or load, i.e., not parallel to the surface of the touch sensor is applied, then the surface of the touch sensor 454 will skew to one side. Sensors, not shown, on plates 446 and 444 detect deformation of compliant touch sensors 454. By detecting deformations, the sensors (not shown) detect direction of forces or loads applied to touch sensors 454 and can also determine the magnitude of the force applied by detecting the amount of deformation of the touch sensors 454.

The compliant touch sensors 454 add a second level of compliance to the robotic finger in FIG. 4 (the series elastic actuators in the proximal phalange portion 404 and distal phalange portion 406 providing the first level of compliance). When an object (not shown) is picked up by the robotic finger 400, the touch sensors 454 are pressed between the underlying structure of the finger 400 and the object (not shown). The touch sensors 454 do not require structural strength to support the object (not shown); the strength is provided by the underlying structure of the finger 400 that backs the touch sensors 454. Thus, the compliant touch sensors 454 can be made of a material that is much softer than the remainder of the finger and that deforms under very small applied forces. By detecting these tiny forces, the robotic finger 400 may apply delicate force to an object (not shown).

The angled surface 450 is a polygonal approximation of a curved fingertip. A curvature of a human fingertip allows the contact with a gripped object to be shifted by rolling the fingertip over the object. The angled surface 450 approximating a curved fingertip, in combination with the touch sensors 454, likewise allow an object grasped by the robotic finger 400 to be shifted to a different orientation.

Figure 5:
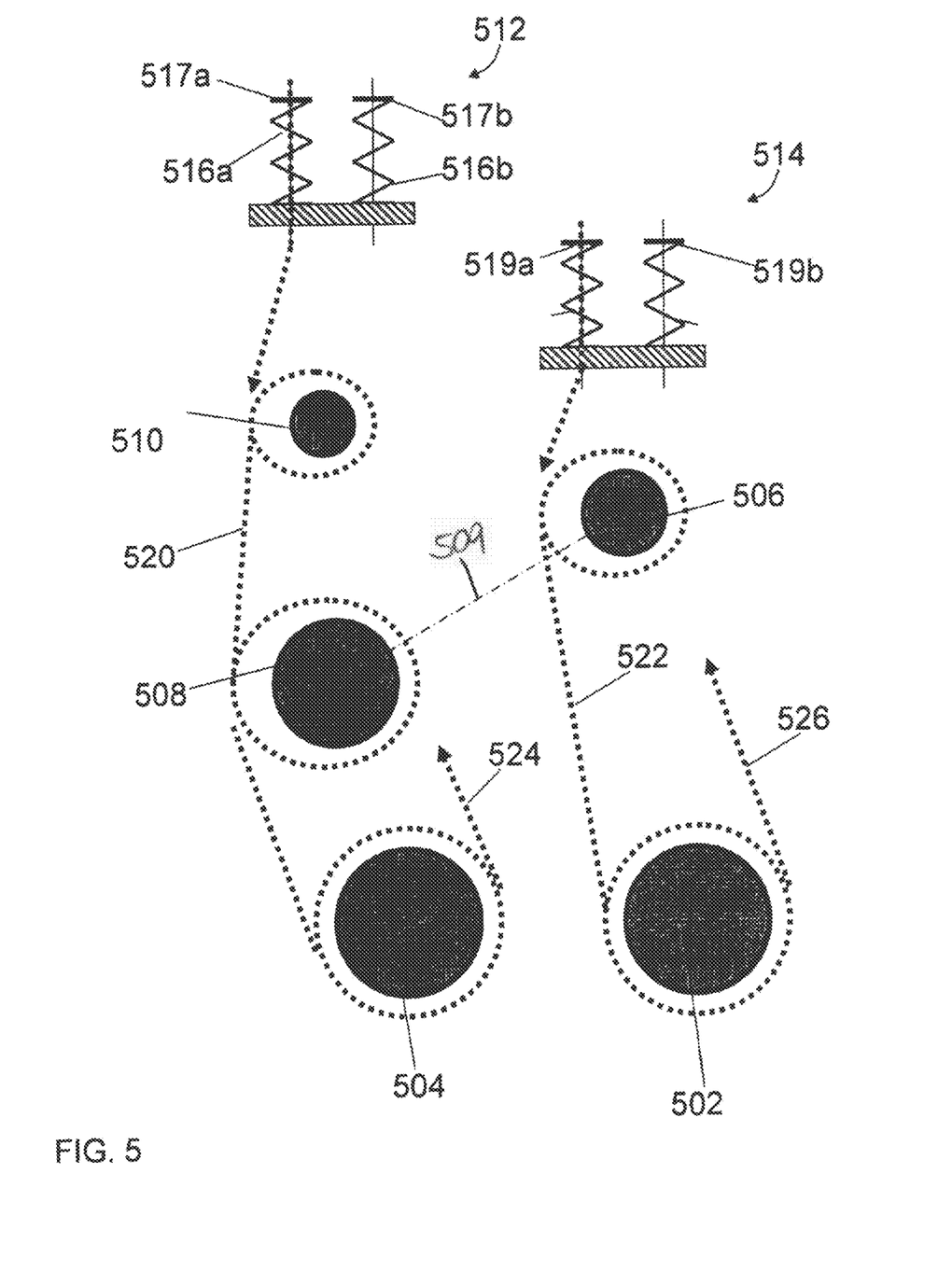
FIG. 5 is a schematic diagram of wires routed in a robotic finger according to an embodiment of the present invention for series elastic actuators.

FIG. 5 shows a schematic representation of routing for wires of series elastic actuators in a robotic finger such as finger 100 in FIG. 1 or finger 400 in FIG. 4. For the purposes of clarity, FIG. 5 will be explained using reference to FIG. 4. However, it should be understood that FIG. 4 may use different wiring configurations from that shown schematically in FIG. 5. FIG. 5 shows a first motor 502 with wire 522 and 526 attached to the motor 502. Wire 526 is shown in incomplete form in FIG. 5, but a person having ordinary skill in the art would understand that wire 526 is continued in a similar but opposite fashion as wire 522 which is to be explained. Wire 522 is attached to pulley 506. With reference to FIG. 4, pulley 506 is similar to pulley 425. Pulley 506 carries wire 522 up to series elastic actuator mechanism 514, which is similar to series elastic actuator 422 in the proximal phalange portion 404 of the finger 400 shown in FIG. 4. The wire 522 can apply tension to endcap 519a to exert a compliant torque on series elastic actuator 514. FIG. 5 also shows a second motor 504 which is similar to motor 418 in FIG. 4. Motor 504 has wires 520 and 524 attached to it. Similarly to wire 526, wire 524 is not shown in completion, but a person having ordinary skill in the art would understand that wire 524 is routed similarly but opposite to wire 520 as described following. Wire 520 wraps around an idler pulley 508 that is similar to idler pulley 424 shown in FIG. 4. Idler pulley 508 is coaxial with pulley 506 as indicated by center line of rotation 509. This is similar to the coaxial relationship of idler pulley 424 to pulley 425 shown in FIG. 4. Wire 520 uses idler pulley merely as a relay, and idler pulley 508 does not exert any torque on any portion of a robotic finger such as finger 400 shown in FIG. 4. Wire 520 continues to pulley 510, which is similar to pulley 434 shown in FIG. 4. Wire 520 can apply a force onto endcap 517 in series elastic actuator 512 thereby compressing spring 516 and causing a compliant torque on series elastic actuator 512. Note that wires 522 and 520 have been described as continuous from motor 504 or 502 up through series elastic actuators 512 and 514. Alternatively, wires 520 and 522 may include multiple wire segments that are coupled together at pulleys 510, 506 and 508.

Figure 6:
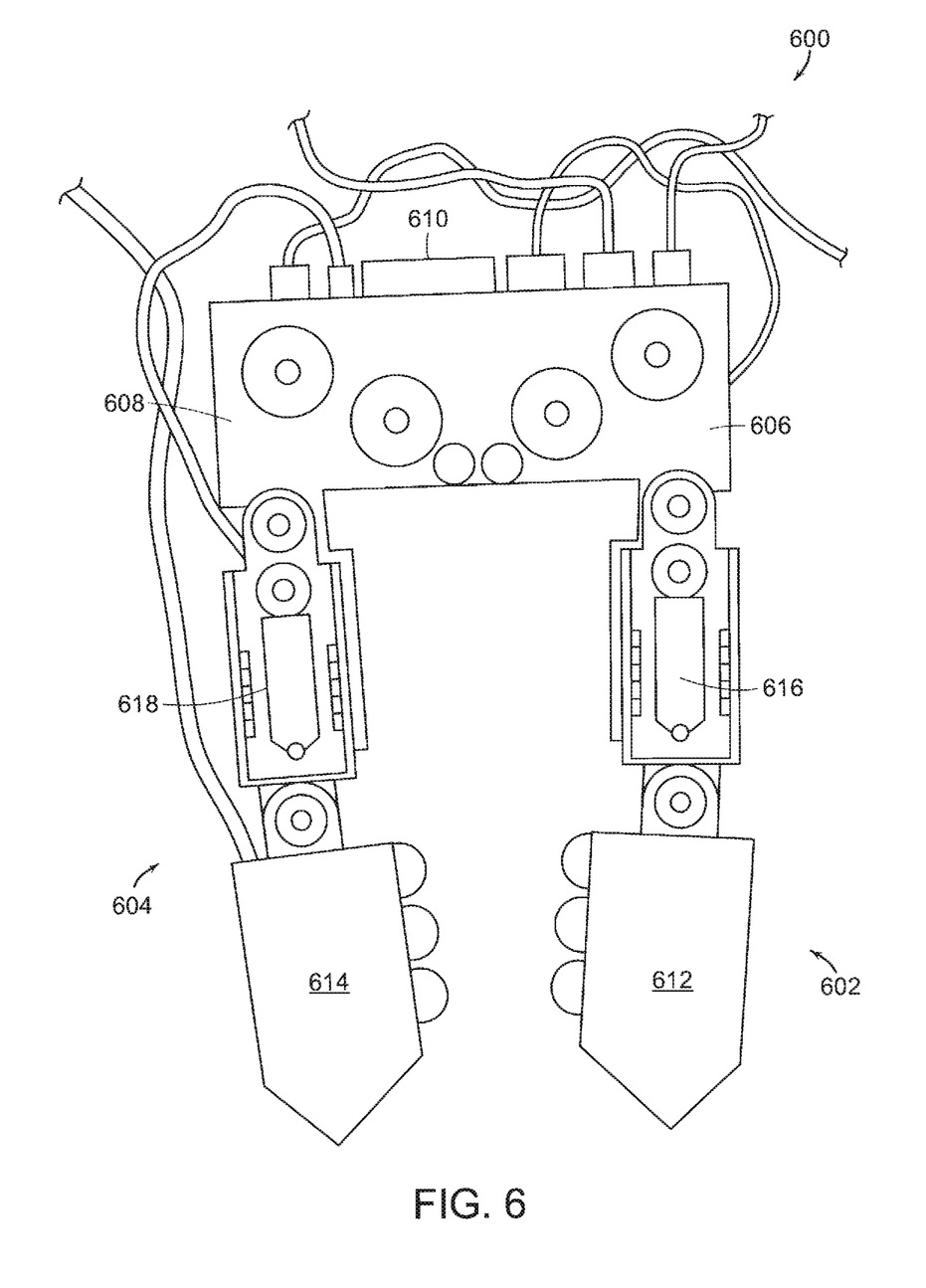
FIG. 6 is a photograph of a robotic hand that includes two robotic fingers according to the present invention that detect contact and interaction between the fingers and an object.

FIG. 6 shows a robotic hand 600 comprising two robotic fingers 602 and 604. Robotic finger 602 includes a base portion 606, a proximal phalange portion 616 and a distal phalange portion 612 having a compliant touch sensor cover. Likewise, finger 604 includes a base portion 608, a proximal phalange portion 618 and a distal phalange portion 614, also having a compliant touch sensor cover. Bases 606 and 618 are mounted in a common frame 610.

Figure 7:
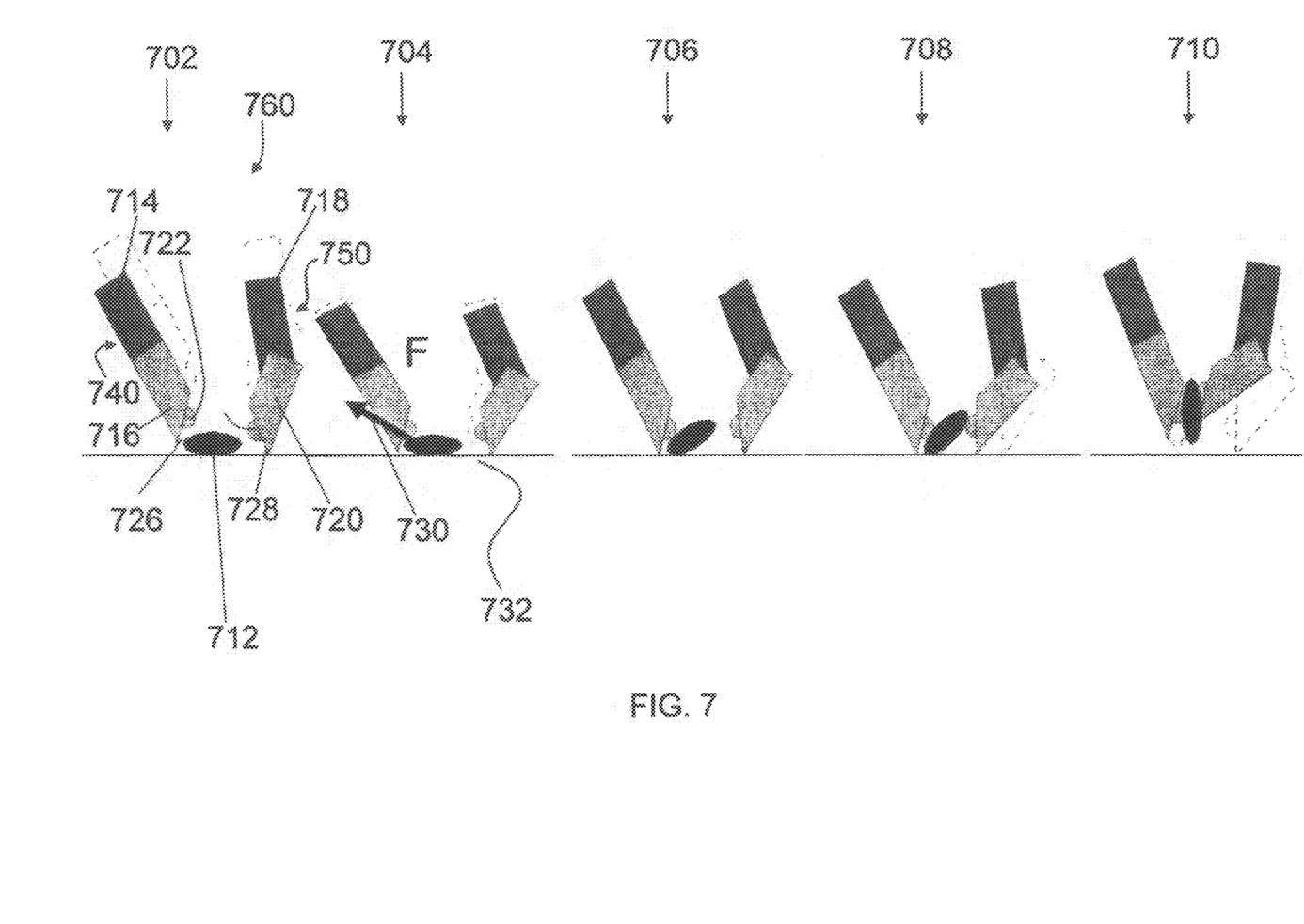
FIG. 7 shows sequential steps of a robotic hand that includes at least two robotic fingers according to the present invention for picking up a stone from a surface.

FIG. 7 is a schematic diagram showing how a robotic hand 760 having two opposing fingers 740, 750, such as hand 600 in FIG. 6, may be used to pick up a small item such as a stone 712, e.g., a biconvex GO stone, on a surface 732. FIG. 7 shows five steps for picking up the stone 712 (note that the reference numbers in FIG. 7 are only shown on a single step, but apply to all five steps). In the first step 702, the two fingers 740, 750 are positioned over the stone 712. Each finger 740, 750 has a proximal phalange 714 and 718, respectively, and a distal phalange 716 and 720, respectively. In step 702, finger 740 has its proximal phalange 714 and distal phalange 716 aligned substantially collinearly. Finger 750 has its distal phalange 720 aligned at an angle to the proximal phalange 718. In step 702, the hand 760 is moved down towards the surface 732 on which the stone 712 is resting. If tip 728 makes contact with the surface 732 before tip 726 or before compliant touch sensor 722 makes contact with the stone 712, then the distal phalange 720 compliantly gives by pivoting with respect to proximal phalange 718. As described above with respect to FIGS. 2B and 3, the pivoting is detected by a controller, so the controller knows that finger 750 is in contact with surface 732. If tip 726 contacts surface 732 or if compliant touch sensor 722 contacts the stone 712 before tip 728 of finger 750 contacts surface 732, then later, in step 706, finger 750 is extended to make contact between tip 728 and surface 732.

In step 704, after finger 750 makes contact with the surface 732, the hand 760 continues to move towards the surface 732. Distal phalange 720 of finger 750, if in contact, continues to compliantly give as the hand 760 continues to move. As finger 740 continues to move towards the surface 732, compliant touch sensor 722 makes contact with the stone 712. The contact with the stone 712 results in a contact force 730 being applied to the compliant touch sensor 722 that causes a measurable deformation of the compliant touch sensor 722. As described in U.S. Publication No. 2008/0106258, the compliant touch sensor 722 provides a controller (not shown) that controls the fingers 740, 750 with a measurement of the contact force 730 being applied to it by the contact with the stone 712 and send a command to stop the motion of the hand.

In step 706, after compliant touch sensor 722 makes contact with the stone 712, the hand 760 continues to move towards the surface 732 until it comes to a complete stop. If in contact with the surface, distal phalange 720 of finger 750 continues to compliantly give as the hand 760 is coming to a stop. As finger 740 moves towards the surface 732, the contact force 730 between the compliant touch sensor 722 and the stone 712 may change in magnitude and also in direction, i.e., the vector of the contact force 730 may change. The compliant touch sensor 722 detects the change in the contact force 730 and provides the detected force to the controller (not shown). The contact force 730 also causes the stone 712 to lift an edge opposite that being contacted by the compliant touch sensor 722. When the tip 726 of distal phalange 716 makes contact with the surface 732, the distal phalange 716 does not compliantly give (or only compliantly gives by an insignificant amount) compared to the compliant give of distal phalange 720 because distal phalange 716 and proximal phalange 714 of finger 740 are substantially colinear to each other. The colinear alignment of the distal phalange 716 and the proximal phalange 714 of finger 740 results in forces from the hand 760 being transmitted on a vector that is almost colinear with the distal phalange 716 and proximal phalange 714. Thus, there is negligible torque being applied about the hinge coupling the distal phalange 716 to the proximal phalange 714. The series elastic actuator (not shown) in distal phalange 716 may apply an actuating force to counteract any torque about the hinge coupling the distal phalange 716 to the proximal phalange 714 to maintain the colinear relationship between the distal phalange 716 and the proximal phalange 714. The finger 750 is extended to make sure that it is in contact with surface 732. A small force is applied to avoid moving the hand 760 away from the surface 732. This places finger 750 in a good position to approach stone 712 at the lowest point possible, which permits the distal phalange 720 of finger 750 to get beneath the stone 712. This is an important step because if the distal phalange 720 cannot move beneath the stone 712, the fingers 740, 750 cannot pick up the stone.

In step 708, finger 750 is moved towards finger 740. The surface 732 prevents the finger 750 from fully moving toward finger 740. If finger 750 was a non-compliant robotic finger, then moving finger 750 towards finger 740 while in contact with surface 732 could be dangerous because the finger 750 may damage the surface 732 or the actuators (not shown) operating finger 750 could be damaged by overloading. The compliant robotic finger 750 can be moved towards finger 740 safely because the compliance ensures that there will be no damage to the surface 732 or to the actuators (not shown) of the finger 750. As finger 750 attempts to move toward finger 740, its interference with surface 732 will result in increasing forces to actuators (not shown) controlling the proximal phalange 718, the distal phalange 720, and/or the hand 760. Alternatively, the forces of actuators (not shown) controlling the proximal phalange 718, the distal phalange 720, and/or the hand 760 may be operated at constant levels predetermined to be sufficient to move the finger 750 towards finger 740 and to keep finger 750 in contact with surface 732.

In step 710, when the increasing forces to actuators (not shown) controlling the proximal phalange 718, the distal phalange 720, and/or the hand 760 reach a predetermined limit, the hand 760 begins to move away from the surface 732. As the hand 760 moves away from the surface 732, fingers 740 and 750 also move away from the surface 732. As finger 750 moves away from the surface 732, the interference between the surface 732 and the tip 728 of distal phalange 720 will decrease, allowing the finger 750 to continue moving closer to finger 740. Eventually, finger 750 will be able to move close enough to finger 740 that the stone 712 will be captured between the two fingers 740, 750 and the stone 712 can be lifted from the surface 732.

Figure 8:
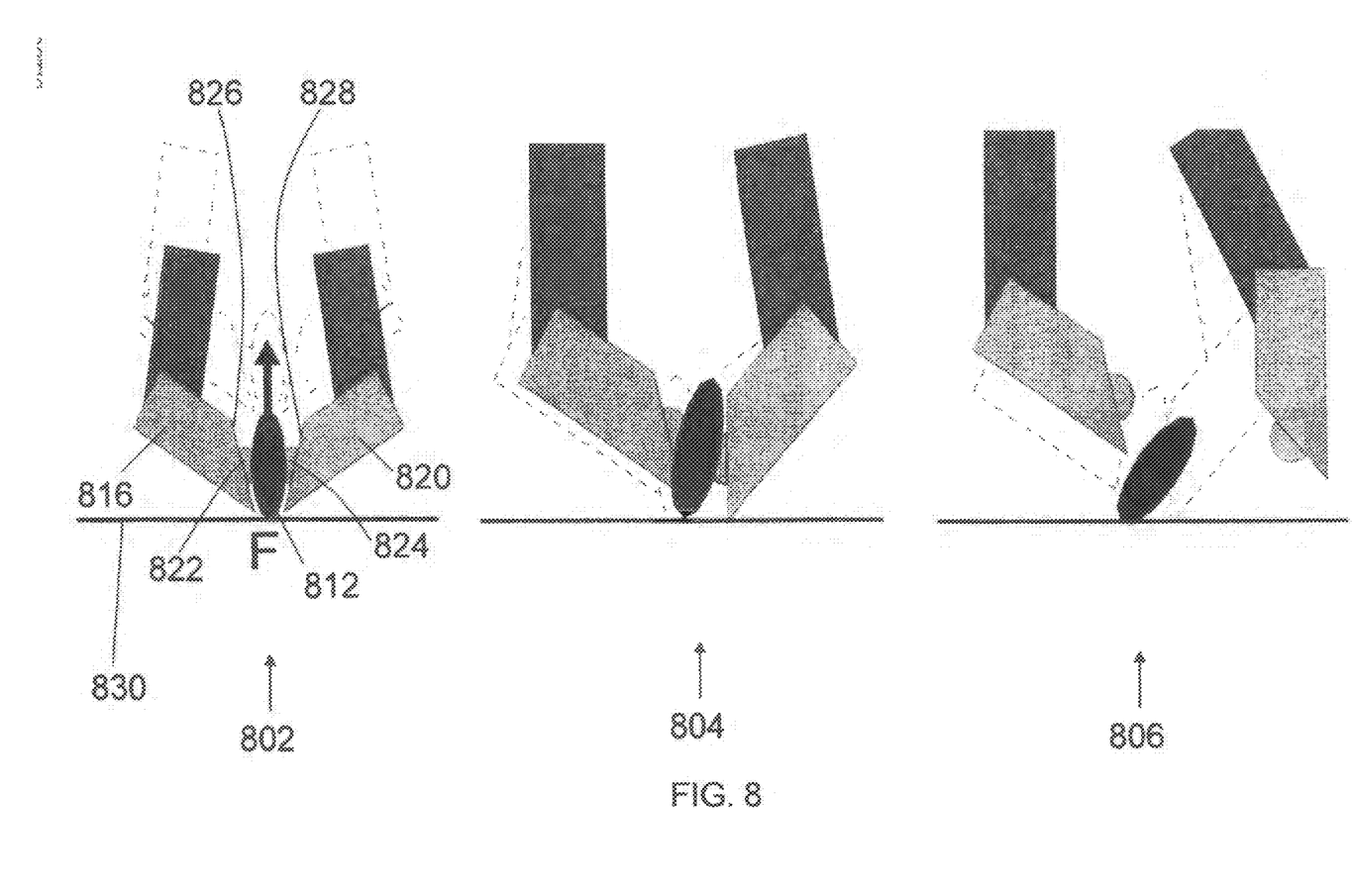
FIG. 8 shows sequential steps of a robotic hand that includes at least two robotic fingers according to the present invention for placing a stone on a surface.

FIG. 8 shows how a stone 812, similar to stone 712, may be placed without simply dropping the stone. In step 802, fingertips 816 and 820 are grasping stone 812 such that the stone 812 is in contact with touch sensors 822 and 824 on angled tip surfaces 826 and 828. Step 802 shows fingertips 816 and 820 moving down towards a surface 830 as indicated by phantom lines. When stone 812 contacts the surface 830, a sheer force will be produced with touch sensors 822 and 824 which is detected by sensors (not shown). In step 804, fingertip 820 is moved away from stone 812 to allow the stone 812 to lower onto the surface 830. At the same time, fingertip 816 moves up to help rotate the stone 812 into its resting position. Finally, step 806 shows finger 820 continuing to move away from the stone 812 and fingertip 816 moving up and away from the stone such that the stone is now resting completely on the surface 830.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A robotic finger having two levels of compliance, comprising:
    a proximal phalange having first and second joint ends;
    a distal phalange having a joint end and a tip end, wherein the joint end of the distal phalange is coupled to the second joint of the proximal phalange in a hinged manner;
    a first compliant actuator configured to exert a torque on the proximal phalange about the first joint end and a second compliant actuator configured to exert a torque on the proximal phalange about the second joint end, the first and second compliant actuators including wires arranged to compress springs within a chamber thereby providing a first level of compliance; and
    at least one compliant touch sensor mounted on the distal phalange, the at least one compliant touch sensor configured to contact an object before the distal phalange and to compliantly conform to the object and to sense the object, the at least one compliant touch sensor providing a second level of compliance.

2. The robotic finger of claim 1 wherein the proximal phalange is coupled to a base at its first joint end in a hinged manner.

3. The robotic finger of claim 2 further comprising at least one compliant touch sensor mounted on the proximal phalange, the at least one compliant touch sensor configured to contact an object before the distal phalange and to compliantly conform to the object and to sense the object.

4. The robotic finger of claim 1 wherein the proximal phalange is coupled to an end of a third phalange in a hinged manner.

5. The robotic finger of claim 1 wherein the at least one compliant touch sensor is configured to sense at least one of normal forces and shear forces.

6. The robotic finger of claim 1 further comprising at least one compliant touch sensor mounted on the proximal phalange, the at least one compliant touch sensor configured to contact an object before the distal phalange and to compliantly conform to the object and to sense the object.

7. The robotic finger of claim 6 wherein the at least one touch sensor mounted on the proximal phalange is configured to sense at least one of normal forces and shear forces.

8. The robotic finger of claim 1 wherein the at least one of the compliant touch sensor is mounted on a tip portion of the distal phalange.

9. The robotic finger of claim 1 wherein the tip end of the distal phalange has an angled surface.

10. The robotic finger of claim 1 further comprising a controller configured to control actuation of the first and second compliant actuators.

11. The robotic finger of claim 10 wherein the controller receives sensor information from the at least one compliant touch sensor and feedback information from the first and second compliant actuators, and wherein the controller controls actuation of the first and second compliant actuators in accord with the received sensor information and feedback information.

12. The robotic finger of claim 10 wherein the first and second compliant actuators are configured to detect forces applied by the proximal and distal phalanges, respectively, and to detect the respective positions of the proximal and distal phalanges.

13. The robotic finger of claim 1 wherein the robotic finger comprises one of a plurality of like robotic fingers that form a robotic hand.

\* \* \* \* \*